United States Patent [19]

Ikemori

[11] Patent Number: 4,995,033
[45] Date of Patent: Feb. 19, 1991

[54] DIGITAL PRIVATE BRANCH EXCHANGE AND METHOD OF MANUFACTURING SAME

[75] Inventor: Kimio Ikemori, Hino, Japan

[73] Assignee: Kabushiki Kaisha Toshiba, Kawasaki, Japan

[21] Appl. No.: 341,015

[22] Filed: Apr. 20, 1989

[30] Foreign Application Priority Data

Apr. 22, 1988 [JP] Japan .................................. 63-99638

[51] Int. Cl.⁵ .............................................. H04J 3/12
[52] U.S. Cl. .................. 370/68.1; 370/110.1
[58] Field of Search ...................... 370/14, 68.1, 110.1, 370/110.2, 110.3

[56] References Cited

U.S. PATENT DOCUMENTS

4,439,639  3/1984  Munter .............................. 370/110.3

Primary Examiner—Douglas W. Olms
Assistant Examiner—Melvin Marcelo
Attorney, Agent, or Firm—Finnegan, Henderson, Farabow, Garrett, and Dunner

[57] ABSTRACT

A digital private branch exchange including a digital trunk which in turn includes a connection request reject channel and a method of controlling the exchange. If there is a connection request to the reject channel, an audible tone signal indicative of the rejection of the connection request is read from a memory provided in the digital trunk, and sent to the extension telephone set which has made the connection request.

15 Claims, 8 Drawing Sheets

DIGITAL PRIVATE BRANCH EXCHANGE AND METHOD OF MANUFACTURING SAME

BACKGROUND OF THE INVENTION

1. Field of the Invention

This invention relates to digital private branch exchanges with a digital trunk which has a channel which rejects a request for connection with another external or extension telephone set (hereinafter referred to as a connection request), and a method of controlling the exchange.

2. Description of the Related Art

Figure 1:
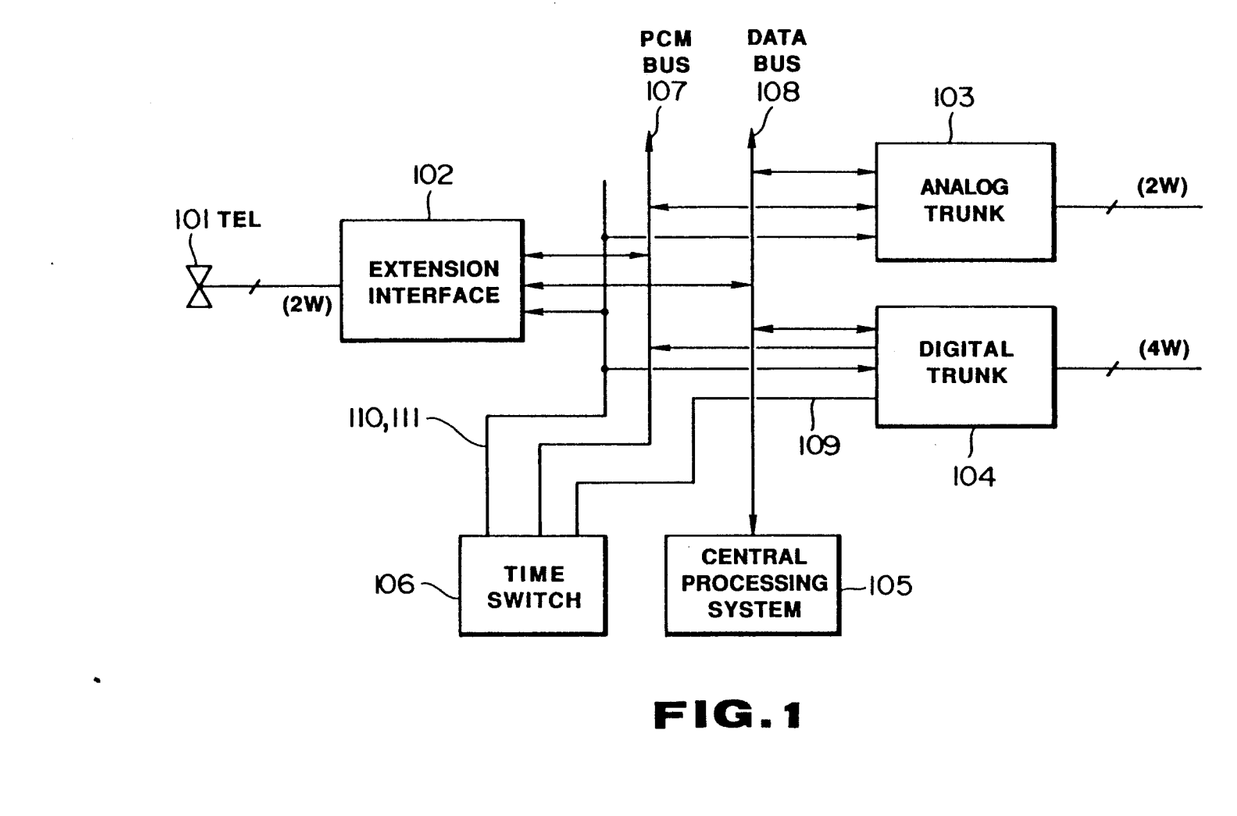
FIG. 1 is a block diagram of a digital exchange.

FIG. 1 shows the structure of a general digital private branch exchange which includes an analog trunk 103 which is connected to an analog network (not shown), and a digital trunk 104 which interfaces with a T1 digital line of a DS-1 format. Reference numeral 102 denotes an extension interface; 105, a central processing system; and 106, a time switch. An extension telephone set 101 is connected to the extension interface 102 to thereby enable transmission/receipt of a signal. The central processing system 105 transmits and receives control data to and from the extension interface 102, analog trunk 103 and digital trunk 104 via a data bus (serial bus) 108.

Figure 2:
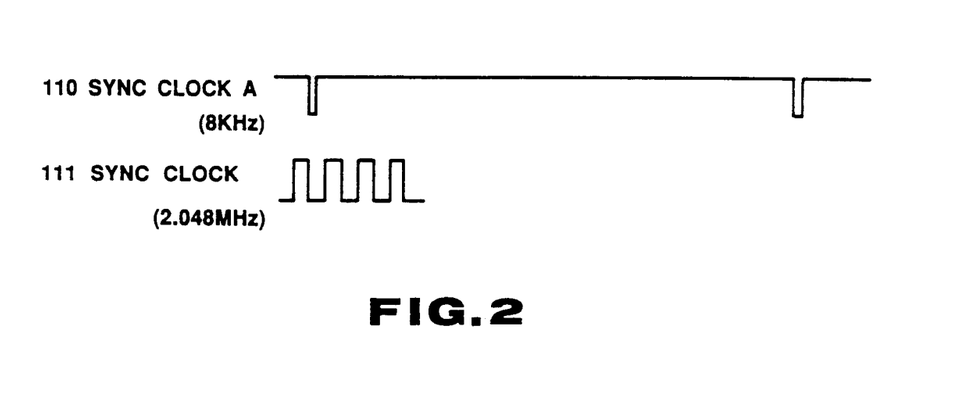
FIG. 2 illustrates synchronizing clocks delivered from the time switch.

The time switch 106 is operated by a synchronizing clock supplied via a signal line 109 from the digital trunk 104, supplies a 8 KHz synchronizing clock and a 2.048 MHz synchronizing clock shown in FIG. 2 via signal lines 110 and 111 to the extension interface 102, analog trunk 103 and digital trunk 104, and changes a signal in a predetermined slot via a PCM bus 107 to thereby enable telephone communication.

Figure 3:
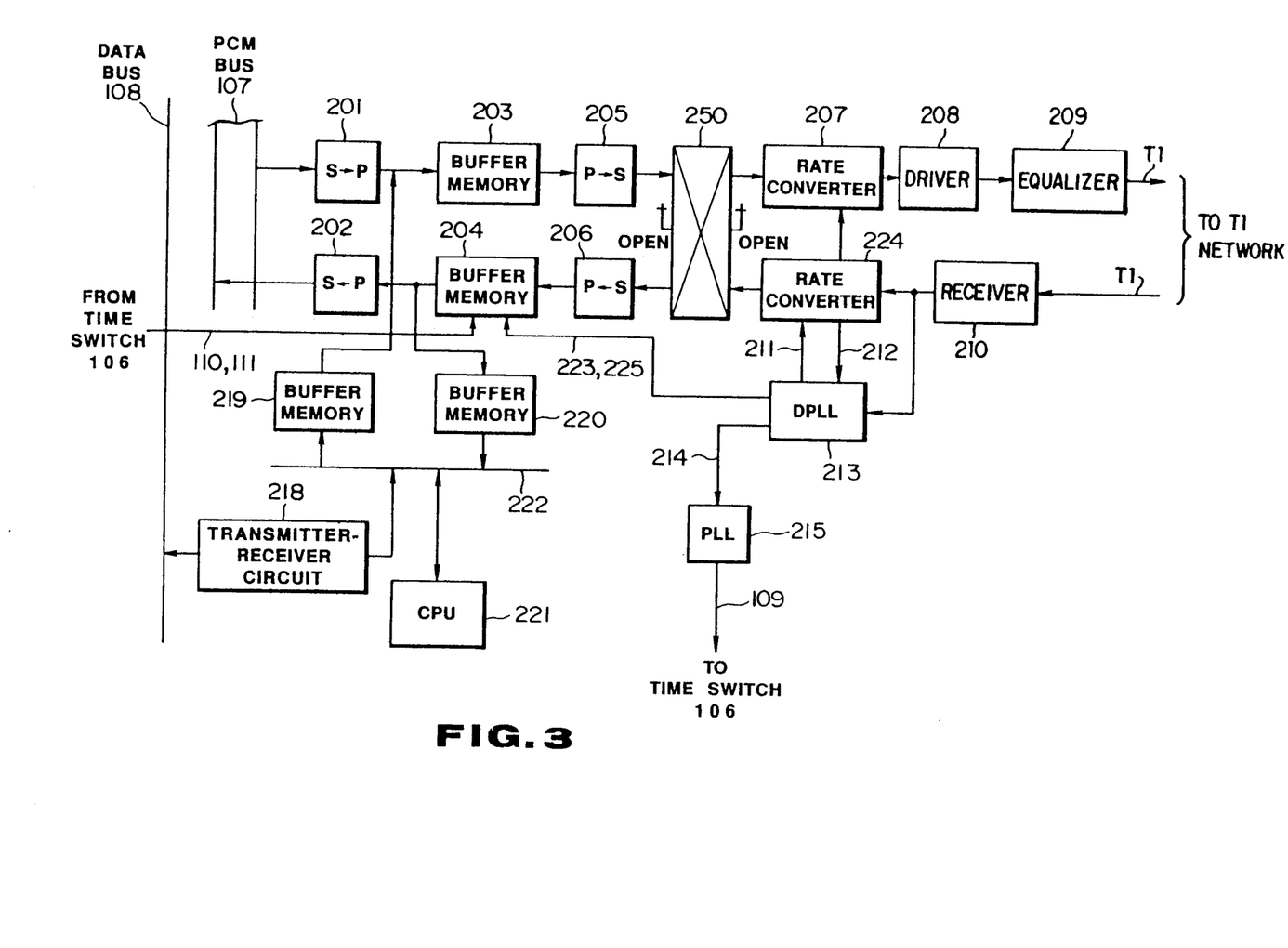
FIG. 3 is a block diagram of a conventional digital trunk.
Figure 4:
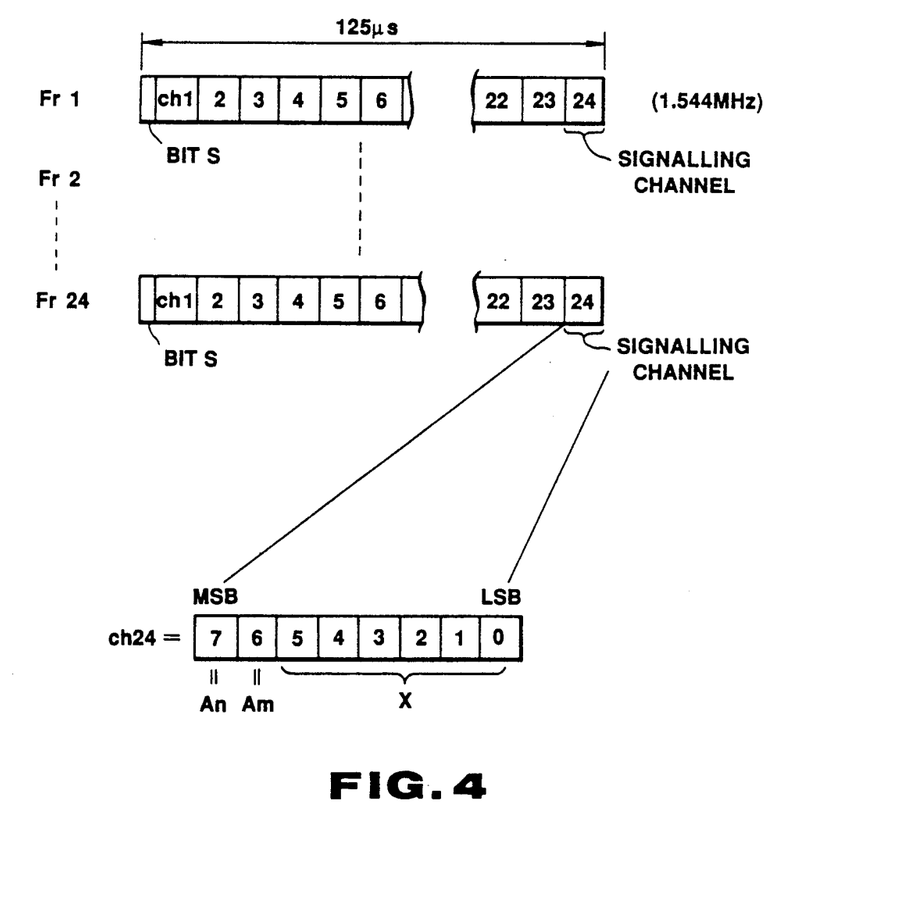
FIG. 4 shows a DS-1 format.

The digital trunk 104 of the exchange has a structure as shown in FIG. 3, and transmits and receives digital data of a DS-1 format shown in FIG. 4 to and from the T1 network (T1 digital line network).

As shown in FIG. 4, the digital data of the DS-1 format has a multi-frame structure of 24 frames (Fr 1, Fr 2, ..., Fr 24), each including 24 channels, each channel composed of 193 bits and operating at 1.544 Mb/s. Each frame starts from a synchronizing S bit. The 24th channel of each frame is one for transmission of signalling data. The signalling data channel is used to transmit signalling data for 23 channels from a channel #1 to a channel #23, so that signalling data is not inserted into one 24th channel at every 24 frames. The signalling data corresponds to data on on-hook/off-hook in the analog trunk and a signal indicative of a dial pulse. Each channel is composed of 8 bits. On the channel #24, signalling data X is inserted into 6 successive bits including LSB. The values determined by the following equations are inserted into An and Am indicative of MSB and the next bit, respectively, of the Xth frame Fr X:

$$\begin{aligned} Am &= Ax \\ An &= Ax + 12 \ (X < 12) \\ &\phantom{=}\ Ax - 12 \ (X > 12) \\ &\phantom{=}\ 1 \ (X = 12, 24) \end{aligned}$$

where

Am: bit data string: $A_1, A_2, A_3, \ldots, A_{12}, \ldots, A_{24}$

An: bit data string: $A_{13}, A_{14}, A_{15}, \ldots, A_{24}, \ldots, A_{12}$ $A_{12} = A_{24} = 1$.

The digital trunk 104 which transmits and receives data of the data format mentioned above includes a S/P converter 201 which receives serial data in the time slots of the PCM bus 107 and converts that serial data to parallel data, and a buffer memory 203 which receives and transmits that data to a P/S converter 205 which converts parallel data to serial data. The buffer memory 204 serves to eliminate a phase difference in synchronizing clock between signal lines 110, 111 and signal lines 223 and 225.

The serial data from the P/S converter 205 is delivered to a crosspoint switch 250, which delivers the data in a predetermined channel output by the converter 205 to a rate converter 207 and data in the other channels to an open terminal to prevent transmission of data in unnecessary channels.

The rate converter 207 serves to eliminate possible difference in transmission rate between data in the exchange and the data in the digital line. The data (subjected to rate conversion) from the rate converter 207 is amplified appropriately by a driver 208, and equalized by an equalizer 209, and delivered onto the T1 digital line which leads to the T1 network.

Conversely, the data of DS-1 format supplied via the T1 digital line from the T1 network is received by a receiver 210, and delivered to a rate converter 224 and a DPLL (digital PLL) 213. The data subjected to rate conversion by the rate converter 224 is processed via the crosspoint switch 250, a S/P converter 206, a buffer memory 204 and a P/S converter 202 in the order converse to that in which the transmitted data is processed.

The DPLL 213 generates a 2 MHz clock from the received data and delivers it to the rate converter 224 via a signal line 211, and generates a 1.5 MHz clock and delivers it to the rate converter 207 via a signal line 212. The DPLL 213 generates a synchronizing clock B of the same frequency as the 8 KHz synchronizing clock B and a 2.048 MHz synchronizing clock as shown in FIG. 2 and delivers these signals to a control circuit 260 (FIG. 5) via signal lines 223 and 225, and the 8 KHz clock to a PPL 215 via a signal line 214.

The PLL 215 generates a synchronizing clock required by the time switch 106 in accordance with a given clock, and delivers it to the time switch 106 via a signal line 109.

A control circuit 260 is supplied with a 8 KHz synchronizing clock A and a 2.048 MHz synchronizing clock via the signal lines 110 and 111 from the time switch 106.

The data bus 108 is connected to transmitter-receiver circuit 218 for data transmission to and reception from the central processing system 105.

Figure 5:
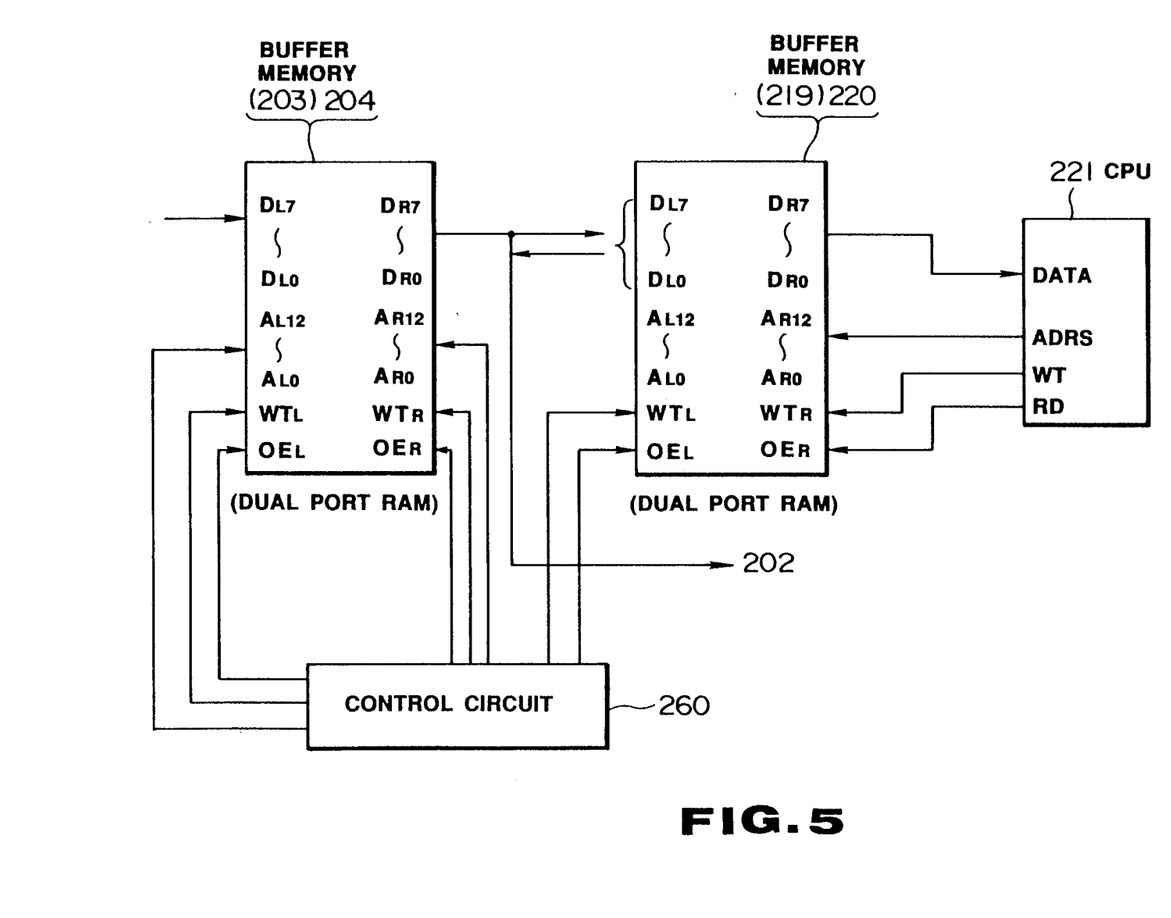
FIG. 5 is a block diagram of the essential portion of FIG. 3.

The transmitter-receiver circuit 218 is connected to a data bus 222 to which a CPU 221, and buffer memories 219 and 220 are connected. The buffer memories 219 and 220 to eliminate the difference in operative rate between the buffer memories 203, 204 and CPU 221. The partial detailed structures of the buffer memories 204 (203), 220 (219), CPU 221 and control circuit 260 are shown in FIG. 5.

The buffer memories 204 (203), 220 (219) each include a dual port RAM. The control circuit 260 writes and reads data to and from the buffer memories 204 (203), writes data to the buffer memory 220, and reads data from the buffer memory 219. The CPU 221 writes data to the buffer memory 219 and reads data from the buffer memory 220.

In the exchange, the connection request data transmitted from the extension telephone set 101 to the digital trunk 104 is delivered via the data bus 108 from the extension interface 102 to the central processing system 105. When the processing system 105 detects that the received data is signalling data on connection request to the digital trunk 104, it delivers off-hook data to the digital trunk 104 via the data bus 108. At the digital trunk 104, the transmitter-receiver circuit 218 receives off-hook data and CPU 221 fetches the off-hook data. CPU 221 writes the off-hook data into the buffer memory 219 at predetermined timing to transmit the channel off-hook data on a connection request by the extension telephone set 101.

Figure 6:
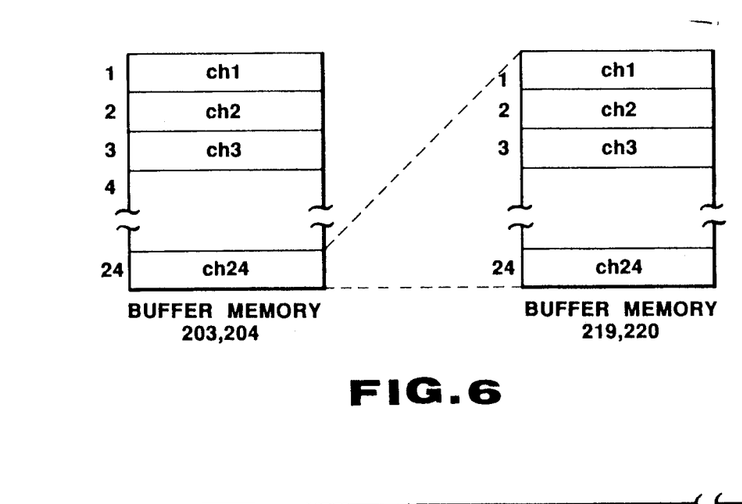
FIG. 6 illustrates data transmission/reception between buffer memories 203, 204 and 219, 220.
Figure 7:
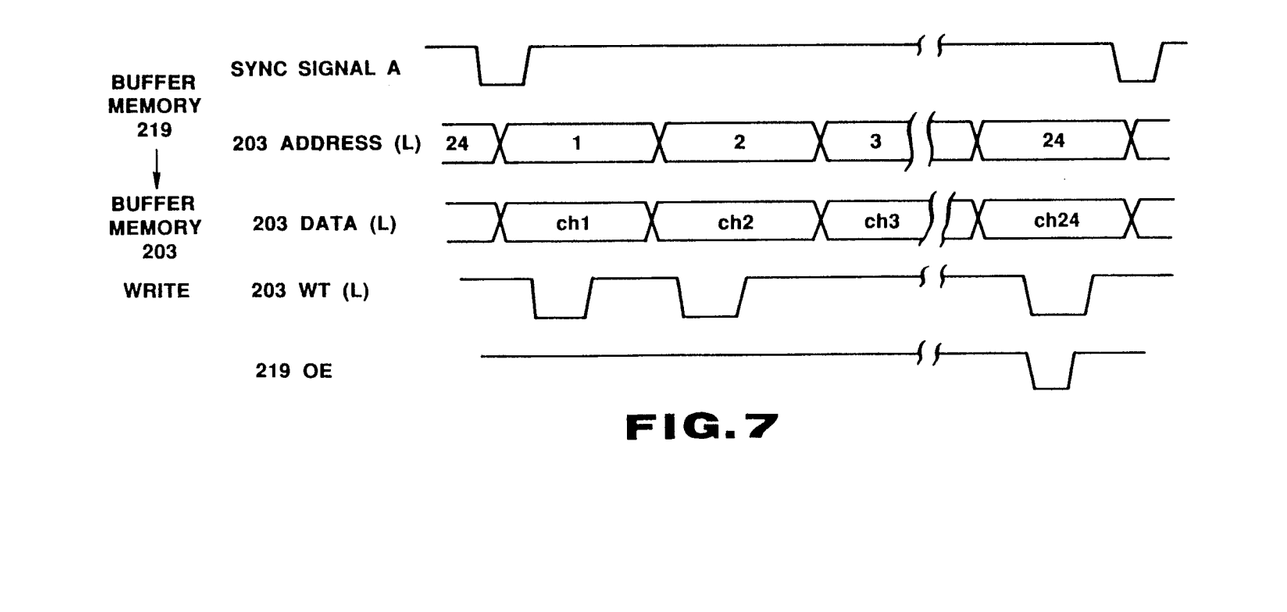
FIG. 7 is a timing chart showing data writing between buffer memories 219 and 203.

FIG. 6 shows how the data ch1-ch24 written into the 24th channel of each of the frames of DS-1 format stored in the buffer memory 220 is transferred to the buffer memory 203 (204). The timing chart for this transfer is shown in FIG. 7.

Figure 8:
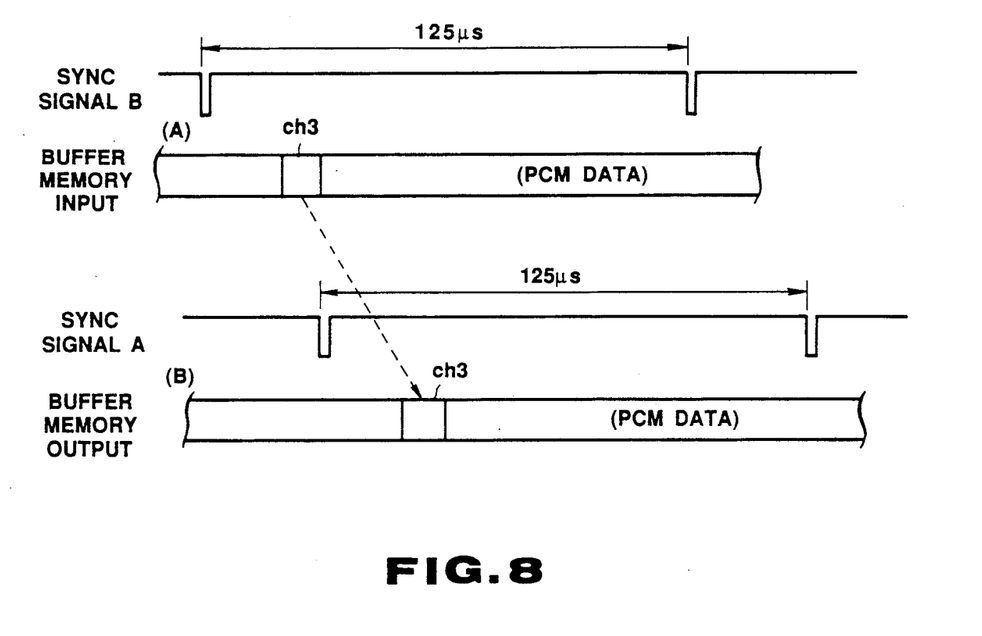
FIG. 8 is a timing chart illustrating reading and writing data from and to buffer memories 203 and 204.

FIG. 8 shows a timing chart showing the operation of the buffer memories 203 and 204. The data input from the channel 3 to the buffer memory 203 is performed at the timing delayed by the slot in the channel 3 from the synchronizing signal B pulse, and the output timing is delayed by the slot in the channel 3 from the synchronizing signal B pulse.

Figure 9:
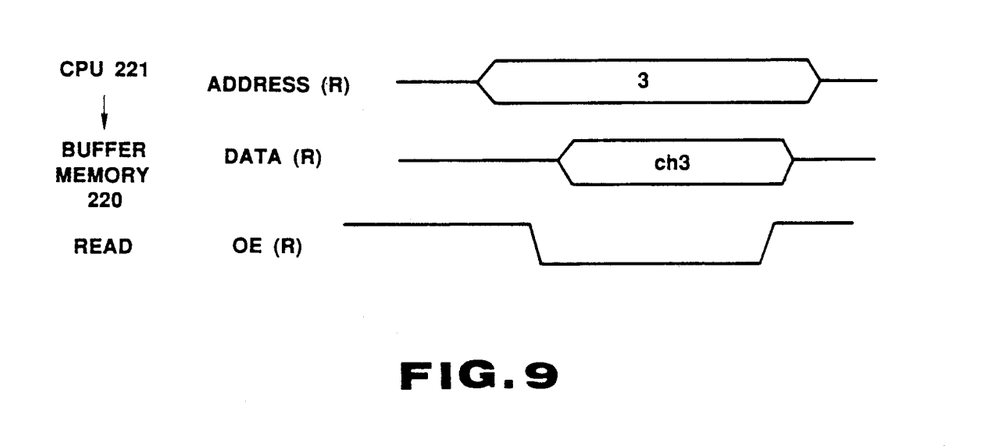
FIG. 9 is a timing chart showing reading data from buffer memory 220.

The CPU 221 outputs control signals as shown by the timing chart in FIG. 9 to obtain data in the buffer memory 220 (the data in the channel #24 of the third frame in the particular embodiment). Like this, CPU 221 writes data to be transmitted into the buffer memory 219, writes the received data into the channel #24 of the respective frames, and reads received data in the channel #24 of the respective frames from the buffer memory 220.

The control circuit 260 receives from the buffer memory 219 the transmitted data in the channel #24 of the respective frames, receives other data from S/P converter 201, writes these data into the buffer memory 203, and writes into the buffer memory 220 the received data in the channels #24 of the respective frames.

In the digital private branch exchange, the central processing system 105 only transmits and receives control data via the digital bus 108 whatever the trunk may be, namely, whether the trunk is of analog type or of digital type, and is not concerned with which channel is used for signalling data delivered to the T1 network from the digital trunk 104. There are various DS-1 formats. In order to enable to handle these formats, respective digital trunks 104 suitable for handling those formats are used, but the central processing system 105 is used without being changed with respect to structure and operation. Therefore, in this case, the central processing system 105 receives from the exchange telephone set 101 the data on a connection request to the channel #24, and delivers off-hook data to the digital trunk 104 as when signalling to a regular channel is performed.

Since the channel #24 is for signalling purposes and not for telephone communication, the digital trunk 104 does not send a connection request signal to the T1 digital network even if it receives the off-hook data, and returns no data to the central processing system 105. Therefore, the extension telephone set 101 which has selected the channel #24 for telephone communication remains mute, so that the user of the extension telephone set cannot know how the situation is and would feel that the extension telephone set is inconvenient to use.

As just described above, according to the conventional exchange, the central processing system performs its processing irrespective of which channel the digital trunk uses for signalling purposes, so that when a connection request signal is sent from the extension telephone set to a connection request reject channel, for example, for signalling purposes, that telephone set remains mute, and the user of the telephone set does not know how the situation is and would feel that the telephone set is inconvenient to use.

It is therefore an object of the present invention to provide a digital private branch exchange which, when an extension telephone set sends a connection request signal to a connection request reject channel of the digital trunk, reports to the telephone set that the connection is rejected to thereby bring about a convenient use of the exchange.

SUMMARY OF THE INVENTION

According to the present invention, there is provided a digital private branch exchange comprising a digital trunk connected to a digital network and having a predetermined channel by which a connection request is rejected, and means for detecting whether there is a connection request from an extension telephone set to the predetermined channel of the digital trunk and for delivering to the extension telephone set an audible tone signal indicative of the reject of the connection request.

According this arrangement, when a connection request is made from an extension telephone set to the predetermined channel by which a connection request is rejected, an audible tone indicative of the rejection of the connection request is delivered to that extension telephone set, and the users of the telephone set can know that fact.

DESCRIPTION OF THE PREFERRED EMBODIMENT

One embodiment of the present invention will now be described with reference to the drawings. The digital private branch exchange according to the present invention is the same in structure as that shown in FIG. 1 except that the digital trunk is different from that 104 shown in FIG. 3. The essential portion of the digital trunk used in the present invention is shown at 104 A in FIG. 10. The same structural portions of the digital trunk 104 A as the corresponding ones of the digital trunk 104 of FIG. 3 are not shown.

Figure 10:
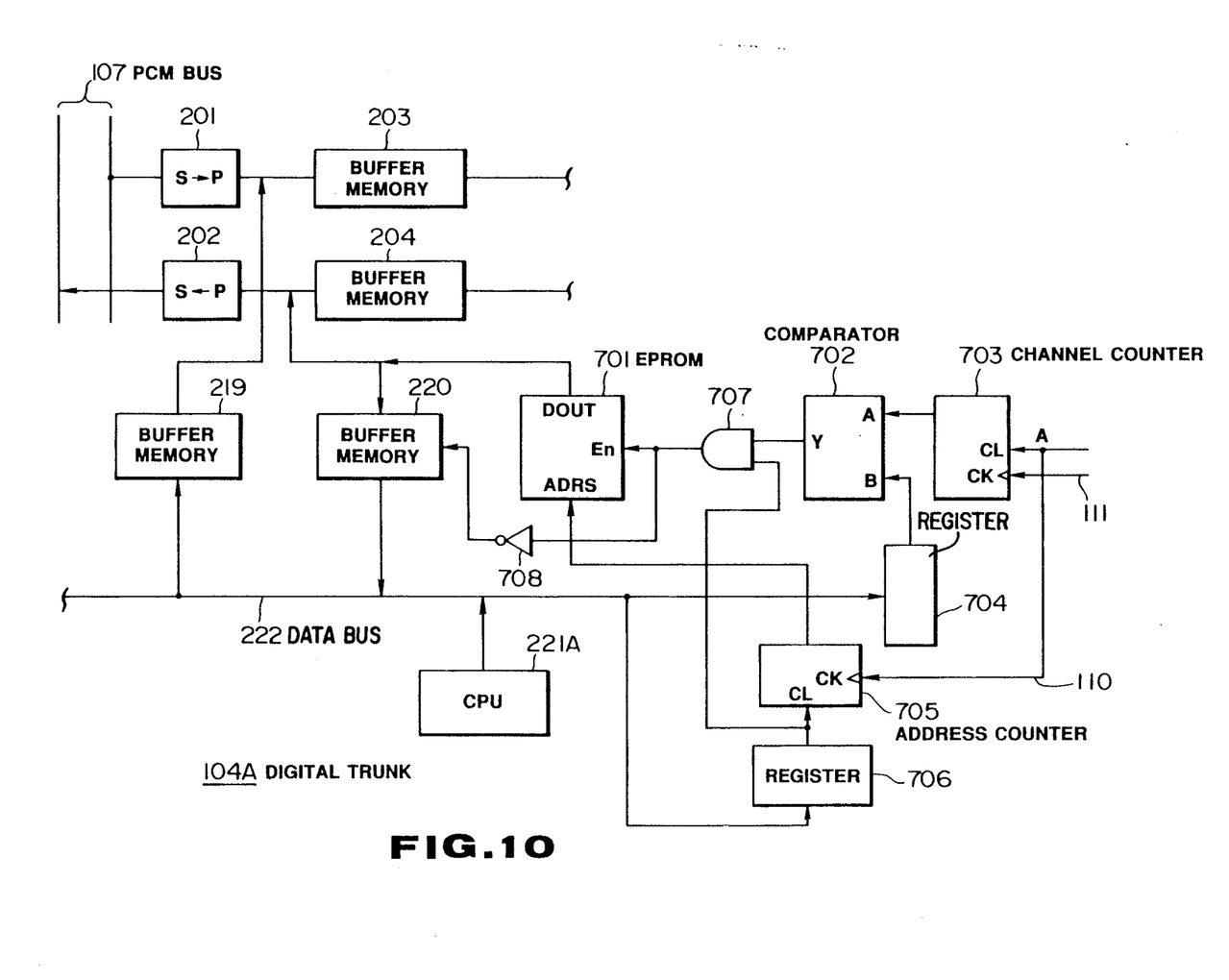
FIG. 10 is a block diagram of the essential portion of the present invention.

In the particular embodiment, a register 704 in which the "number" data on a connection request reject channel is set, and a register 706 in which the data "1" used for transmission control of an audible tone signal is set are connected to data bus 222. The trunk 104 A further includes an EPROM 701 in which PCM data as an audible tone signal indicative of the rejection of the connection request is stored, a channel counter 703 indicative of whether data corresponding to any particular channel of DS-1 format is delivered on the PCM bus 107, a comparator 702 for detecting the timing at which data corresponding to the connection request reject channel of DS-1 format is delivered to the PCM bus 107, an address counter 705 designating address in the EPROM 701, an AND gate 707 for enabling/disabling EPROM 701, and an inverter 708 for inhibiting the buffer memory 220 from being written.

The channel counter 703 is cleared by a synchronizing clock A pulse on the signal 110, and incremented synchronously with a synchronizing clock pulse on the signal 111. The output from the channel counter 703 and the contents of register 704 are delivered to the comparator 702 for comparing purposes.

If "0" is placed in the register 706, the address counter 705 is cleared while if "1" is placed, the counter 705 is incremented in accordance with the synchronizing A pulse on the signal line 110. The address counter 705 delivers an address indicated by 0-23 to the address terminals of the EPROM 701.

When "1" is set in the register 706 and coincidence is detected by the comparator 702, the AND gate 707 outputs a high level signal to enable the EPROM 701 while the high level signal is converted by AND gate 707 to a low level signal, which is applied to the buffer memory 220 to thereby inhibit same from being written. The output data from the EPROM 701 is delivered via the P/S converter 202 to a time slot corresponding to the channel #24 of DS-1 format of the PCM bus 107.

The CPU 221A checks which channel of DS-1 format the off-hook data delivered via the data bus 108 from the central processing system 105 represents a connection request to. Since the off-hook data contains data on a channel by which a connection request signal is to be transmitted, the CPU 221A detects whether it is a connection request to the signalling channel (connection request channel) #24 in accordance with that channel data. If so, "24" is set in the register 704 and "1" is set in the register 706.

Figure 11:
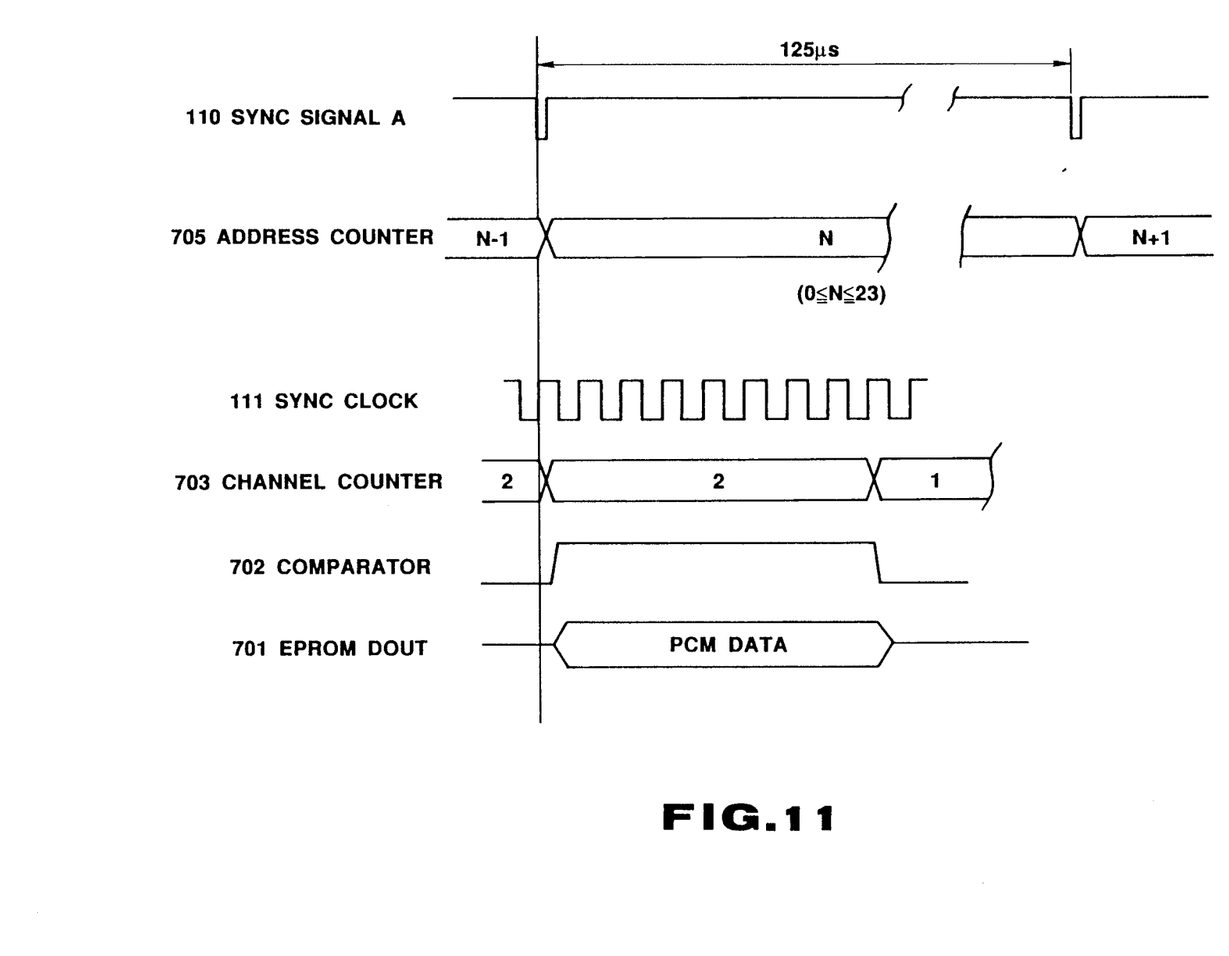
FIG. 11 is a timing chart illustrating the operation of the trunk of FIG. 10.

In operation, if the extension telephone set 101 makes a connection request to the channel #24 of the digital trunk 104A, data on the connection reject is delivered from the extension interface 102 to the central processing system 105 via the data bus 108. The central processing system 105 detects that data and delivers off-hook data (on the channel #24) via the data bus 108 to the digital trunk 104A. The CPU 221A receives this off-hook data via the transmitter-receiver circuit 218 and the data bus 222, and detects that that data is indicative of a connection request to the signalling channel #24, sets "24" in the register 704, and sets "1" in the register 706. At this time, the channel counter 703 provides its output as "1"-"24" synchronously with synchronizing clock pulses delivered via signal line 111. The "1"-"24" is indicative of which channel of DS-1 format the time slot in the PCM bus 107 corresponds to. If the output of the channel counter 703 becomes "24", the two inputs coincide in the comparator 702, the output of which is at high ("1") level, so that the AND gate 707 output changes to high level. As a result, the EPROM is enabled, and the buffer memory 220 is inhibited from being written. Thus, PCM data corresponding to the data on a reorder tone stored in the EPROM 701 is output at the timing of the channel #24 in accordance with an address output by the address counter 705, and delivered via the PCM bus 107 from the P/S converter 202 to the time switch 107 and the extension interface 102, so that the user can hear the reorder tone at the extension telephone set 101 (FIG. 11).

In summary, in the particular embodiment, a connection request signal is transmitted to the signalling channel #24, a reorder tone indicative of the rejection of the connection request is delivered to the extension telephone set and the user can recognize that fact. If a channel other than the channel #24 is used for the rejection of a connection request, the digital trunk 104A can adjust to this situation.

The time slot to which PCM data is delivered corresponds to a channel to which no data is originally delivered by the crosspoint switch 250. Namely, any particular one (s) of channels #1-#23 of TS-1 format delivered from the T1 network is not used, the receiver 210 side and the open terminal of the crosspoint switch 250 are connected at the timing of the channel not used to thereby form an empty time slot, which is allocated to the chanel #24 in the PCM bus 107. The signalling data of the channel #24 is written into the buffer memory 220 by the control circuit 260. The data in the channels #1-#23 are newly placed in the time slots of the PCM bus 107 corresponding to the channels #1-#23. However, empty time slots are not used excluding ones into which PCM data are inserted corresponding to the channel #24.

What is claimed is:

1. A digital private branch exchange comprising:
   a digital trunk adapted to a plurality of channels, said channels establishing a plurality of audio paths and at least one communication path, said at least one communication path being a connection request reject channel;
   means for detecting a connection request to the connection request reject channel from an extension telephone set; and
   means for sending a return signal to the extension telephone set indicating that the connection request to the connection request reject channel is rejected 2. A digital private branch exchange according to claim 1, wherein the connection request reject channel is for transmitting signalling data.

3. A digital private branch exchange comprising:
   a digital trunk adapted to a plurality of channels, said channels establishing a plurality of audio paths and at least one communication path, said at least one communication path being a connection request reject channel;
   means for detecting a connection request to the connection request reject channel from an extension telephone set; and
   said digital trunk further comprising:
   means for interrogating the connection request reject channel following a connection request from an extension telephone set to the connection request reject channel;
   means for generating a return signal to be sent to an extension telephone set indicating the rejection of the connection request to the connection request channel;

means for sending the return signal generated by the generating means to an extension telephone set via the connection request reject channel interrogated by the interrogating means.

4. A digital private branch exchange according to claim 3, wherein the connection request reject channel is for transmitting signalling data.

5. A digital private branch exchange according to claim 3, wherein the detecting means comprises:

register means for storing a channel number corresponding to the connection request reject channel following a connection request to the connection request reject channel;

channel counter means for counting and storing synchronizing clock pulses corresponding to a channel number; and comparator means for comparing the channel number stored in the register means and the clock pulses corresponding to a channel number in the channel counter means, and for generating an output signal indicating the coincidence of the connection request reject channel number in the register means and the clock pulses corresponding to the channel number of the connection request reject channel in the counter means.

6. A digital private branch exchange according to claim 3, wherein the return signal generating means comprises:

memory means for storing data corresponding to a predetermined return signal;

address counter means for providing an address output corresponding to a channel number to the memory means; and enabling means for enabling the reading of the data corresponding to the return signal from the memory means when a connection request to the connection request reject channel is detected by the detecting means.

7. A digital private branch exchange according to claim 6, wherein the enabling means comprises:

register means for storing data corresponding to a channel requested by a connection request from an extension telephone set; and logical means for enabling the reading of data from the memory means when data stored in the register means corresponds to the connection request reject channel and the detecting means detects a connection request to the connection request reject channel.

8. A digital private branch exchange comprising:

an extension interface connected to at least one extension telephone set;

an analog trunk connected to an analog line;

a digital trunk connected to a digital line, and adapted to a plurality of channels, said channels establishing a plurality of audio paths and at least one communication path, said at least one communication path being a connection request reject channel;

a data bus for transmitting control data;

a PCM bus for transmitting PCM signals comprising data frames, each of said data frames being transmitted at a predetermined rate, and including data corresponding to said plurality of channels;

central processing means for controlling transmission and receipt of control data via the data bus between the extension interface, the analog trunk, and the digital trunk, and for detecting a connection request from an extension telephone set to the connection request reject channel; and time switch means responsive to a first synchronizing clock from the digital trunk for generating a second synchronizing clock, said second synchronizing clock being connected to the extension interface, the analog truck and the digital trunk, said digital trunk further comprising:

means for interrogating data in a data frame corresponding to the connection request reject channel following a connection request to the connection request reject channel by an extension telephone set;

means for generating a return signal to be sent to the extension telephone set indicating the rejection of the connection request to the connection request reject channel; and means for sending the return signal generated by the generating means to the extension telephone set, via the PCM bus in the data corresponding to the connection request reject channel interrogated by the interrogating means.

9. A digital private branch exchange according to claim 8, wherein the connection request reject channel is one for transmitting signalling data.

10. A digital private branch exchange according to claim 8, wherein the second synchronizing clock includes a channel clock synchronous with one of said plurality of channels and a frame clock synchronous with the a data frame transmitted on the PCM bus.

11. A digital private branch exchange according to claim 10, wherein the interrogating means comprises:

register means for storing the channel number corresponding to the connection request reject channel following a connection request to the connection request reject channel;

channel counter means for counting and storing channel clock pulses from the time switch corresponding to a channel number; and comparator means for comparing the channel number stored in the register means and the channel clock pulses corresponding to a channel number in the channel counter means, and for generating an output signal indicating the coincidence of the connection request reject channel number in the register means and the channel clock pulses corresponding to the channel number of the connection request reject channel in the counter means.

12. A digital private branch exchange according to claim 10, wherein the return signal generating means comprises:

memory means for storing data corresponding to a predetermined return signal;

address counter means for counting frame clock pulses from the time switch and for providing an address output corresponding to a channel number to the memory means; and enabling means for enabling the reading of the data corresponding to the return signal from the memory means when a connection to the connection request reject channel is detected by the interrogating means.

13. A digital private branch exchange according to claim 12, wherein the enabling means comprises:

register means for storing data corresponding to a channel requested by a connection request from an extension telephone set; and logical means for enabling the reading of data from the memory means when data stored in the register means corresponds to the connection request reject channel and the interrogating means detects data corresponding to the connection request reject channel.

14. A method of controlling a digital private branch exchange, comprising the steps of:

detecting whether there is a connection request from an extension telephone set to a predetermined connection request reject channel of a digital trunk; and sending an audible return signal to the extension telephone set indicating that the connection request to the connection request reject channel is rejected.

15. A method of controlling a digital private branch exchange, comprising the steps of:

detecting whether there is a connection request from an extension telephone set to a predetermined connection request reject channel of a digital trunk; and generating a return signal to be sent to the extension telephone set indicating that the connection request to the connection request reject channel is rejected.

* * * * *